(12) United States Patent
Nagamatsu et al.

(10) Patent No.: US 7,716,857 B2
(45) Date of Patent: May 18, 2010

(54) FLUID SHOVEL APPARATUS AND METHOD

(76) Inventors: Brian H. Nagamatsu, 8 Hillock Ct., Glenville, NY (US) 12302; Felicia M. Nagamatsu, 8 Hillock Ct., Glenville, NY (US) 12302

( * ) Notice: Subject to any disclaimer, the term of this patent is extended or adjusted under 35 U.S.C. 154(b) by 0 days.

(21) Appl. No.: 11/786,233

(22) Filed: Apr. 11, 2007

(65) Prior Publication Data

US 2008/0253874 A1    Oct. 16, 2008

(51) Int. Cl.
    *E01H 5/00*       (2006.01)
(52) U.S. Cl. .............................. 37/241; 37/266; 37/270; 37/285
(58) Field of Classification Search ................ 37/241, 37/270, 285, 225; 294/54.5
    See application file for complete search history.

(56) References Cited

U.S. PATENT DOCUMENTS

| | | | | |
|---|---|---|---|---|
| 266,121 | A | * | 10/1882 | Etzler .......................... 172/755 |
| 1,526,903 | A | * | 2/1925 | Connolly ...................... 37/197 |
| 1,747,258 | A | * | 2/1930 | O'Neil .......................... 294/49 |
| 2,598,952 | A | * | 6/1952 | Weingart ..................... 294/54.5 |
| 2,638,730 | A | * | 5/1953 | Davidson ................. 56/400.14 |
| 3,174,477 | A | * | 3/1965 | Wilson .................. 126/271.2 A |
| 3,365,822 | A | * | 1/1968 | Bryson ......................... 37/283 |
| 3,619,917 | A | * | 11/1971 | Fishcer ......................... 37/266 |
| 3,685,592 | A | * | 8/1972 | Frisbee ......................... 172/811 |
| 4,033,055 | A | * | 7/1977 | Lazarecky .................... 37/230 |
| 4,068,725 | A | * | 1/1978 | Watson .................... 172/701.1 |
| 4,070,771 | A | * | 1/1978 | Yakiwchuk .................. 37/285 |
| 4,104,812 | A | * | 8/1978 | Stribiak, Jr. .................. 37/243 |
| 4,226,034 | A | * | 10/1980 | Benjamin et al. ............. 37/229 |
| 4,413,371 | A | * | 11/1983 | Tuggle et al. ................. 15/405 |
| 4,532,725 | A | * | 8/1985 | Trejo et al. ................... 37/243 |
| 4,651,452 | A | | 3/1987 | Husso |
| 4,884,314 | A | * | 12/1989 | Miner et al. .................. 15/344 |
| 4,910,893 | A | * | 3/1990 | Asay ............................ 37/281 |
| 5,054,159 | A | * | 10/1991 | Richardson .................. 15/400 |
| 5,058,235 | A | * | 10/1991 | Charky ...................... 15/340.1 |
| 5,072,486 | A | * | 12/1991 | Guarascio .................... 15/401 |
| 5,152,126 | A | * | 10/1992 | Cousineau ................... 37/342 |
| 5,170,943 | A | * | 12/1992 | Artzberger ................. 239/532 |
| 5,305,585 | A | * | 4/1994 | Cousineau ....................... 56/8 |
| 5,477,583 | A | * | 12/1995 | Deloe ...................... 15/236.01 |
| 5,522,162 | A | | 6/1996 | Allison |
| 5,991,973 | A | * | 11/1999 | Simpson ...................... 15/402 |
| 6,158,152 | A | * | 12/2000 | Nathenson et al. ........... 37/347 |
| 6,158,791 | A | | 12/2000 | Drew |

(Continued)

OTHER PUBLICATIONS

Office Action (Mail Date Jul. 22, 2009) for U.S. Appl. No. 12/069,139, filed Feb. 7, 2008; Confirmation No. 5182.

*Primary Examiner*—Thomas A Beach
*Assistant Examiner*—Matthew R Buck
(74) *Attorney, Agent, or Firm*—Schmeiser, Olsen & Watts (57) ABSTRACT

A fluid shovel apparatus that pushes and lifts loose material such as snow, leaves, sand, dirt, grass clippings, mulch, or the like. The present invention includes at least one fluid exhaust port located in a blade. Pressurized fluid flows through the blade and ejects out through the at least one fluid exhaust port towards loose material. The loose material floats on a cushion of pressurized fluid that forms between the blade and the loose material. The loose material is pushed away from the blade and is lifted in an upward direction.

28 Claims, 6 Drawing Sheets

U.S. PATENT DOCUMENTS

| | | | |
|---|---|---|---|
| 6,494,514 B1 * | 12/2002 | Stinnett et al. | 294/59 |
| 6,643,958 B1 | 11/2003 | Krejci | |
| 6,808,332 B1 * | 10/2004 | Demuth et al. | 401/266 |
| 6,944,980 B1 * | 9/2005 | Lefrancois | 37/285 |
| 7,287,926 B2 * | 10/2007 | Demuth et al. | 401/266 |
| 2002/0095824 A1 * | 7/2002 | Johnson | 37/241 |
| 2004/0154125 A1 * | 8/2004 | Houvener | 15/339 |
| 2004/0189029 A1 * | 9/2004 | Harrison et al. | 294/54.5 |

\* cited by examiner

FLUID SHOVEL APPARATUS AND METHOD

BACKGROUND OF THE INVENTION

The present invention relates generally to shovels for pushing and lifting loose material such as snow, leaves, sand, dirt, grass clippings, mulch, grain, flour, or the like.

Shovels are well known in the art. Typically, shovels have included a blade that comes in direct contact with loose material while pushing the loose material. Additionally, the loose material must also be lifted and tossed to a desired location. This lifting requires significant energy for heavy loose material. Significant frictional force is created between the blade and the loose material as the loose material is pushed or lifted by the shovel. Significant work and effort is required to overcome this frictional force. If the loose material is wet such as snow, wet leaves, wet dirt, or the like, the scraping of the shovel along a support surface does not completely remove the loose material from the support surface. Additionally, the shovel does not remove any remaining moisture from the support surface.

SUMMARY OF THE INVENTION

In order to overcome the above deficiencies, the present invention provides a fluid shovel apparatus for easily pushing and lifting loose material such as snow, leaves, sand, dirt, grass clippings, mulch, grain, flour, or any other suitable material. The present invention provides a fluid shovel apparatus wherein a pressurized fluid is used to push and lift the loose material. At least one fluid exhaust port is located in a blade. The pressurized fluid flows through the blade and ejects out through the at least one fluid exhaust port and is directed towards the loose material. The pressurized fluid pushes the loose material in a direction away from the blade. Additionally, the pressurized fluid flows in an upward direction away from the blade and carries the loose material in an upward direction. Therefore, the fluid shovel apparatus does not have to be physically lifted in an upward direction in order to lift and toss the loose material. Additionally, the pressurized fluid prevents the loose material from coming in contact with the blade. The loose material floats on a cushion of pressurized fluid that forms between the blade and the loose material. This results in an elimination of the friction between the material and the blade. Therefore, much less energy and effort is required to push the loose material.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Figure 1:
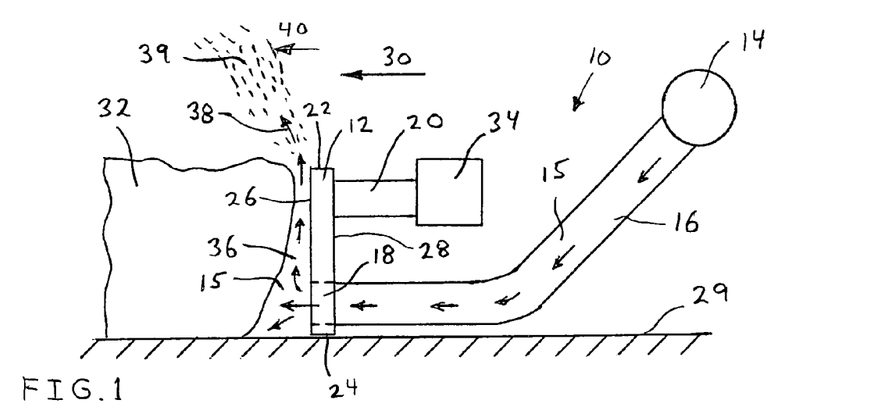
FIG. 1 illustrates a side view of a fluid shovel apparatus according to a preferred embodiment of the present invention.

Referring to FIG. 1, there is illustrated a side view of a fluid shovel apparatus 10 in accordance with a preferred embodiment of the present invention. The fluid shovel apparatus 10 includes a blade 12, a pressure apparatus 14, a pressurized fluid 15, a conduit system 16, at least one fluid exhaust port 18, and a propulsion member 20. The blade 12 includes an upper surface 22, a lower surface 24, a front face 26, and a rear face 28. The front face 26 of the blade 12 is substantially a flat surface. The lower surface 24 of the blade 12 may rest upon a support surface 29. The support surface 29 may include any suitable surface such as a paved surface, a sidewalk, a hard packed surface or the like. The pressure apparatus 14 provides the pressurized fluid 15. The pressure apparatus 14 may include any suitable pressure source such as a pump, a blower, a fan, a portable blower, or the like. The pressurized fluid 15 may include any suitable fluid such as air, nitrogen, water, or the like. The pressurized fluid 15 flows from the pressure apparatus 14 through the conduit system 16 and through the fluid exhaust port 18. The fluid exhaust port 18 is an opening through the blade 12 from the rear face 28 to the front face 26 of the blade 12. Therefore, the pressurized fluid 15 flows through the blade 12 and ejects through the front face 26 of the blade 12. The pressurized fluid 15 leaves the fluid exhaust port 18 in the front face 26 in a direction substantially perpendicular to the front face 26 of the blade 12.

The propulsion member 20 is used to move the blade 12 in a forward direction (directional arrow 30) towards a pile of loose material 32. The propulsion member 20 may be attached to or pushed by a propulsion system 34. The propulsion system 34 may include any suitable propulsion system such as a person, a garden tractor, an all terrain vehicle, a lawn mower, a truck, a motorized vehicle, or the like. The loose material 32 may include any loose material such as snow, leaves, sand, dirt, grass clippings, mulch, granular material, grain, flour, or the like.

As the blade 12 approaches the loose material 32, the pressurized fluid 15 ejecting from the fluid exhaust port 18 pushes the loose material 32 away from the front face 26 of the blade 12. As the blade 12 moves closer to the loose material 32 a region 36 of pressurized fluid 15 is formed between the front face 26 of the blade 12 and the loose material 32. This region 36 of pressurized fluid 15 prevents the loose material 32 from coming in contact with the front face 26 of the blade 12. The loose material 32 floats on a cushion of pressurized fluid 15 that forms between the front face 26 of the blade 12 and the loose material 32. This results in elimination of friction between the loose material 32 and the front face 26 of the blade 12. Therefore, much less energy and effort is required to push the loose material 12 in the forward direction (directional arrow 30). Additionally, the pressurized fluid 15 flows away from the region 36 of pressurized fluid 15 in an upward direction (directional arrow 38). This upward flow of pressurized fluid 15 carries the loose material 32 in the upward direction 38. Therefore, loose material 32 is lifted in an upward direction 38 without having to physically lift the blade 12. When the loose material 32 is snow and the pressurized fluid 15 is air, the pressurized fluid 15 pulverizes the snow into small dry flakes 39 which are lifted in the upward direction 38 and carried away by any blowing wind 40. Additionally, the pressurized fluid 15 removes moisture surrounding the small dry flakes 39. Additionally, the pressurized fluid 15 strikes and support surface 29 and completely cleans and dries the support surface 29.

Figure 2:
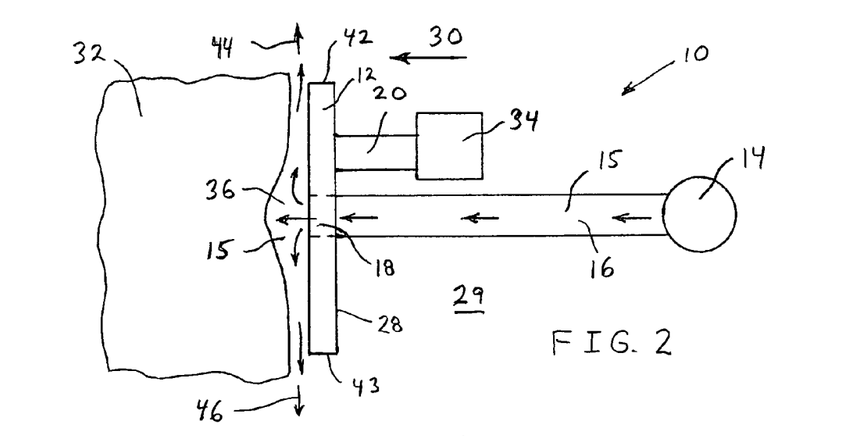
FIG. 2 illustrates a plan view of the fluid shovel apparatus of FIG. 1.

FIG. 2 illustrates a plan view of the fluid shovel apparatus 10 of FIG. 1. The blade 12 includes a right face 42 and a left face 43. The pressurized fluid 15 leaves the fluid exhaust port 18 in the front face 26 in a direction substantially perpendicular to the front face 26 of the blade 12. The pressurized fluid 15 ejecting from the fluid exhaust port 18 pushes the loose material 32 away from the front face 26 of the blade 12. As the blade 12 moves closer to the loose material 32 the region 36 of pressurized fluid 15 is formed between the front face 26 of the blade 12 and the loose material 32. This region 36 of pressurized fluid 15 prevents the loose material 32 from coming in contact with the front face 26 of the blade 12. The loose material 32 floats on a cushion of pressurized fluid 15 that forms between the front face 26 of the blade 12 and the loose material 32. The pressurized fluid 15 flows away from the region 36 in an upward direction (directional arrow 38) as shown in FIG. 1. Additionally, the pressurized fluid 15 flows away from the region 36 in a direction to the right (directional arrow 44) and in a direction to the left (directional arrow 46). The pressurized fluid 15 flowing away from the blade 12 in the direction to the right 44 carries loose material 32 away from the right face 42 of the blade 12. The pressurized fluid 15 flowing away from the blade 12 in the direction to the left 46 carries loose material 32 away from the left face 43 of the blade 12.

Figure 3:
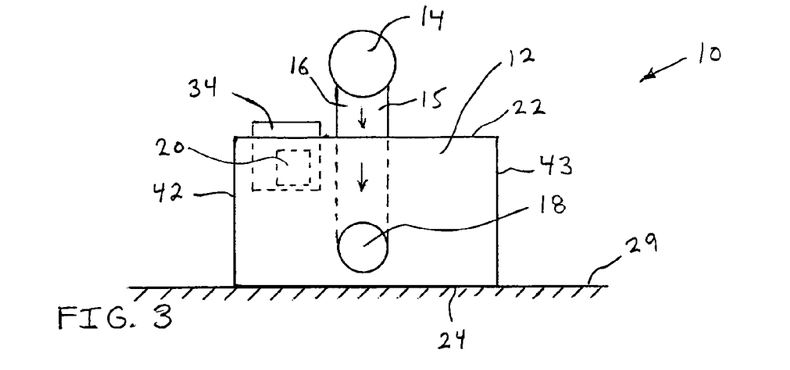
FIG. 3 illustrates a front view of the fluid shovel apparatus of FIG. 1.

FIG. 3 illustrates a front view of the fluid shovel apparatus 10 of FIG. 1. The pressurized fluid 15 flows from the pressure apparatus 14 through the conduit system 16 and through the fluid exhaust port 18. The fluid exhaust port 18 is an opening through the blade 12. The fluid exhaust port 18 may be any suitable shape such as circular, oval, elliptical, or the like. The fluid exhaust port 18 may be adjacent to the lower surface 24 of the blade 12. In this position, the pressurized fluid 15 flowing from the fluid exhaust port 18 very effectively sweeps the loose material 32 away from the blade 12 and from the support surface 29. Additionally, if the loose material 32 is wet, the pressurized fluid removes any moisture remaining on the support surface 29.

Figure 4:
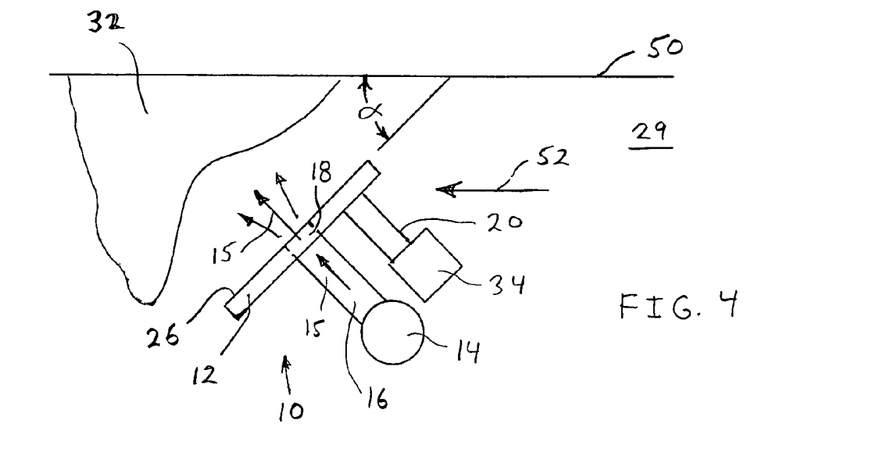
FIG. 4 illustrates a plan view of the fluid shovel apparatus, wherein a blade of the fluid shovel apparatus is at a yaw angle relative to a curb while the fluid shovel apparatus is being propelled in a direction parallel to the curb.

FIG. 4 illustrates a plan view of the fluid shovel apparatus 10, wherein the front surface 26 of the blade 12 of the fluid shovel apparatus 10 is at a yaw angle ($\alpha$) relative to a curb 50. The yaw angle ($\alpha$) is less than 90 degrees and is preferably about 45 degrees. The curb 50 is at the edge of the support surface 29. The fluid shovel apparatus 10 is being moved in a direction (directional arrow 52) parallel to the curb 50. The lower surface 24 of the blade is resting upon the support surface 29. The pressurized fluid 15 leaves the fluid exhaust port 18 in a direction substantially perpendicular to the front face 26 of the blade 12. As the blade 12 is propelled in the direction (directional arrow 52) towards the loose material 32 the pressurized fluid 15 pushes the loose material 32 towards and over the curb 50. This action removes loose material 32 from the support surface 29 and pushes the loose material over the curb 50.

Figure 5:
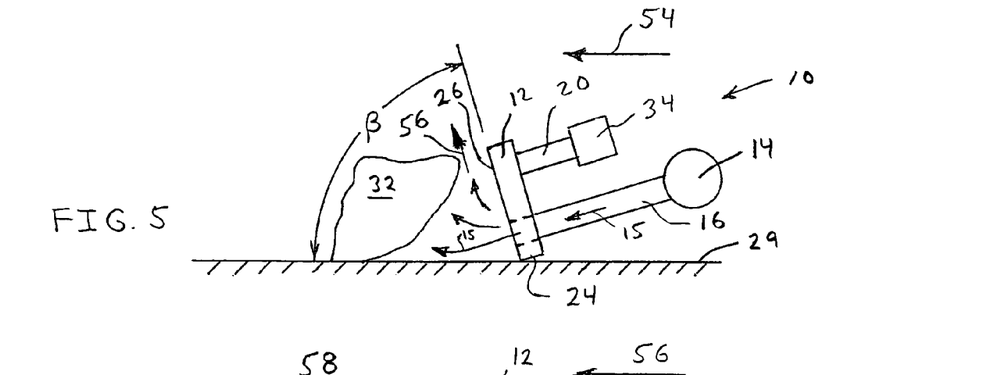
FIG. 5 illustrates a side view of the fluid shovel apparatus, wherein the blade is tilted at a pitch angle relative to a support surface and the fluid shovel apparatus is being propelled in a direction parallel to the support surface.

FIG. 5 illustrates a side view of the fluid shovel apparatus 10, wherein the front surface 26 of the blade 12 is tilted at a pitch angle ($\beta$) relative to the support surface 29. The pitch angle ($\beta$) is less than 90 degrees. The fluid shovel apparatus 10 is being moved in a direction (directional arrow 54) towards the pile of loose material 32. The lower surface 24 of the blade 12 is resting upon the support surface 29. The pressurized fluid 15 leaves the fluid exhaust port 18 in a direction substantially perpendicular to the front face 26 of the blade 12. As the blade 12 is propelled in the direction (directional arrow 54) towards the loose material 32 the pressurized fluid 15 pushes under the loose material 32 and lifts and raises the loose material 32 from the support surface 29. Additionally, the pressurized fluid 15 flows between the front surface 26 of the blade 12 and the loose material 32. This upward flow (directional arrow 56) of the pressurized fluid 15 lifts loose material 32 in an upward direction (directional arrow 56) above the blade 12. Additionally, if the loose material 32 is wet, the pressurized fluid removes any moisture remaining on the support surface 29.

Figure 6:
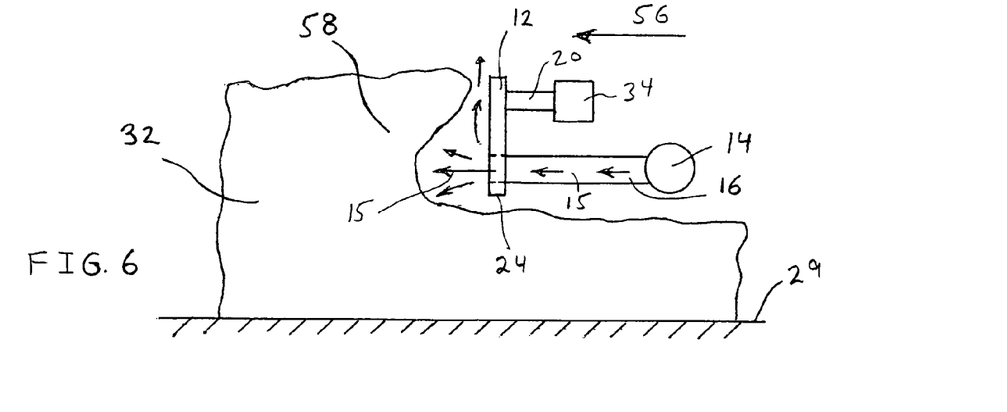
FIG. 6 illustrates a side view of the fluid shovel apparatus, wherein the blade is elevated above a pile of loose material.

FIG. 6 illustrates a side view of the shovel apparatus 10, wherein the blade 12 is elevated above a pile of loose material 32. The blade 12 is not limited to having to rest upon the support surface 29. FIG. 6 shows the fluid shovel apparatus 10 being moved in a direction (directional arrow 56) essentially parallel to the support surface 29. The fluid shovel apparatus 10 is removing loose material 32 from an upper portion 58 of a pile of loose material 32.

Figure 7:
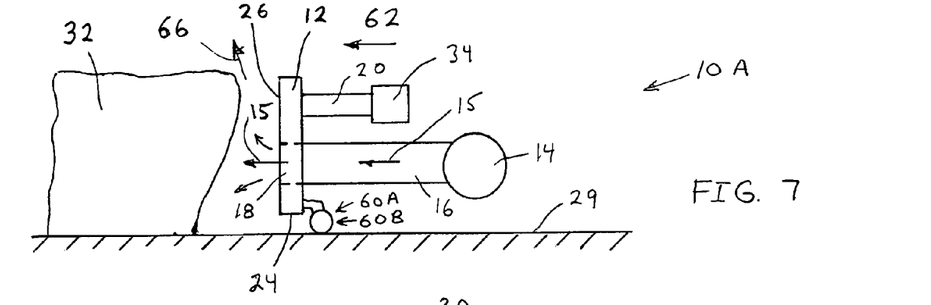
FIG. 7 illustrates a side view of another embodiment of a fluid shovel apparatus in accordance with the present invention, wherein the fluid shovel apparatus includes wheel assemblies for rolling the blade along the support surface.
Figure 8:
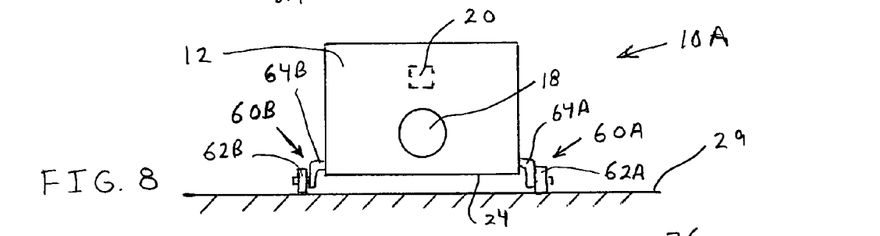
FIG. 8 illustrates a front view of the fluid shovel apparatus of FIG. 7.

FIGS. 7 and 8 illustrate another embodiment of a fluid shovel apparatus 10A, in accordance with the present invention, wherein the fluid shovel apparatus 10A includes a wheel assembly 60A and a wheel assembly 60B for rolling the blade 12 along a support surface 29. The wheel assembly 60A includes a wheel 62A and a wheel bracket 64A. The wheel 62A is rotatably attached to the bracket 64A. The bracket 64A is attached to the blade 12, wherein the lower face 24 of the blade 12 is lifted above the support surface 29. The wheel 62A contacts and rolls along the support surface 29. The wheel assembly 62B includes a wheel 62B and a wheel bracket 62B. The wheel 62B is rotatably attached to the bracket 64B. The bracket 64B is attached to the blade 12, wherein the lower face 24 of the blade 12 is lifted above the support surface 29. The wheel contacts and rolls along the support surface 29. The fluid shovel apparatus 10A is rolled in a forward direction (directional arrow 62) towards the pile of loose material 32. The loose material 32 may include any loose material such as snow, leaves, sand, dirt, grass clippings, mulch, granular material, grain, flour, or the like. The propulsion member 20 is used to push the blade 12 in the forward direction (directional arrow 62) towards the pile of loose material 32. The propulsion member 20 may be attached to or pushed by a propulsion system 34. The propulsion system 34 may include any suitable system propulsion system such as a person, a garden tractor, a truck, a motorized vehicle, or the like. The pressurized fluid 15 leaves the exhaust port 18 and blows the loose material 32 in a direction (directional arrow 62) away from the front face 26 of the blade 12. Additionally, the pressurized fluid 15 flows between the front surface 26 of the blade 12 and the loose material 32. This upward flow (directional arrow 66) of the pressurized fluid 15 lifts loose material 32 in a upward direction above the blade 12.

Figure 9:
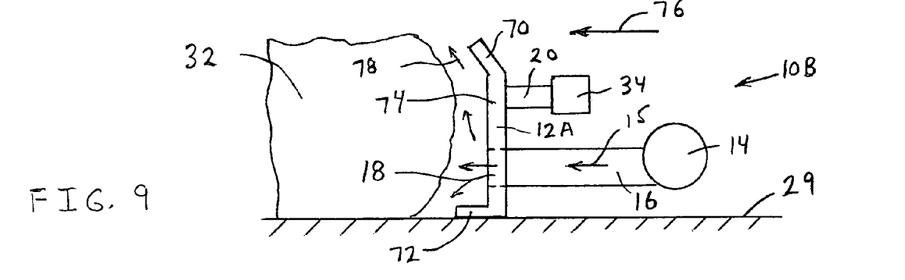
FIG. 9 illustrates a side view of another embodiment of a fluid shovel apparatus in accordance with the present invention, wherein a blade includes a top upward protruding portion and a bottom protruding portion.

FIG. 9 illustrates another embodiment of a fluid shovel apparatus 10B in accordance with the present invention. The fluid shovel apparatus 10B includes a blade 12A. The blade 12A includes a flat portion 74, a top upward protruding portion 70 and a bottom protruding portion 72. The top upward protruding portion 70 is angled in a forward direction (directional arrow 76). The bottom protruding portion 72 is substantially perpendicular to the flat portion 74. The bottom protruding portion 72 rests upon the support surface 29. As the blade 12A is propelled in the forward direction (directional arrow 76) towards the loose material 32 the pressurized fluid 15 ejects from the exhaust port 18 and pushes the loose material 32 in the forward direction (directional arrow 76) away from the blade 12A. Additionally, the pressurized fluid 15 flows in an upward flow direction (directional arrow 78) along the top upward protruding portion 70 of the blade 12A. This pressurized fluid 15 flowing in the upward flow direction (directional arrow 78) carries loose material 32 upward and forward of the blade 12A.

Figure 10:
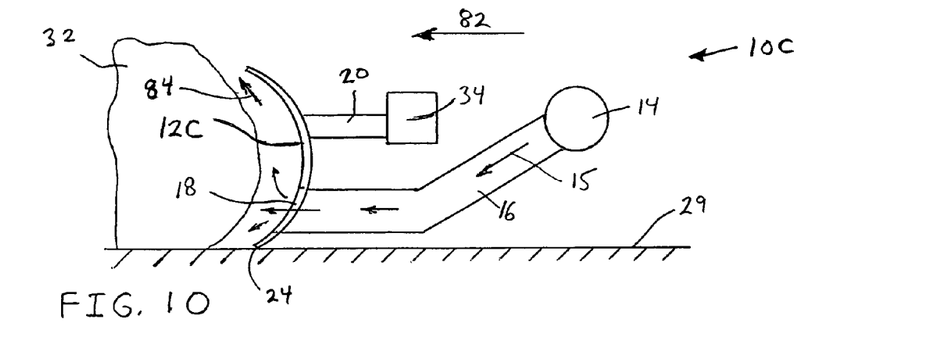
FIG. 10 illustrates a side view of another embodiment of a fluid shovel apparatus in accordance with the present invention, wherein a blade includes a forward concave curving surface.

FIG. 10 illustrates a side view of another embodiment of a fluid shovel apparatus 10C in accordance with the present invention. The fluid apparatus 10C includes a concave curving blade 12C. The concave curving blade 12C may include any suitable concave shape such as circular, elliptical, or the like. The fluid exhaust port 18 may be located adjacent to the support surface 29. The lower surface 24 of the blade 12C may rest upon the support surface 29. The blade 12C is propelled in a forward direction (directional arrow 82) towards the loose material 32. The pressurized fluid 15 ejects from the exhaust port 18 and pushes the loose material 32 in the forward direction (directional arrow 82) away from the concave curving blade 12C. Additionally, the pressurized fluid 15 flows in an upward direction (directional arrow 84) along the concave curving blade 12C. This pressurized fluid 15 flowing in the upward flow direction (directional arrow 84) carries loose material 32 upward and forward of the concave curving blade 12C.

Figure 11:
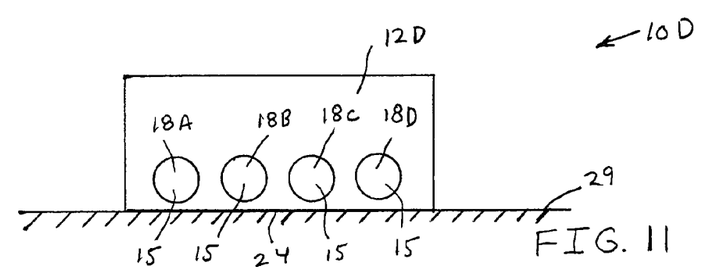
FIG. 11 illustrates a front view of another embodiment of a fluid shovel apparatus in accordance with the present invention, wherein a blade includes a plurality of fluid exhaust ports.

FIG. 11 illustrates a front view of another embodiment of a fluid shovel apparatus 10D in accordance with the present invention. The fluid shovel apparatus 10D includes a blade 12D. The blade 12D includes a plurality of fluid exhaust ports 18A, 18B, 18C, and 18D. The pressurized fluid 15 flows out of each fluid exhaust port 18A, 18B, 18C, and 18D in a direction substantially perpendicular to the blade 12D. The lower surface 24 of the blade 12D rests upon the support surface 29. The fluid exhaust ports 18A, 18B, 18C, and 18D may be located adjacent to the support surface 29. Only exhaust ports 18A-18D are shown in this figure, however any number of exhaust ports may be included in the blade 12D.

Figure 12:
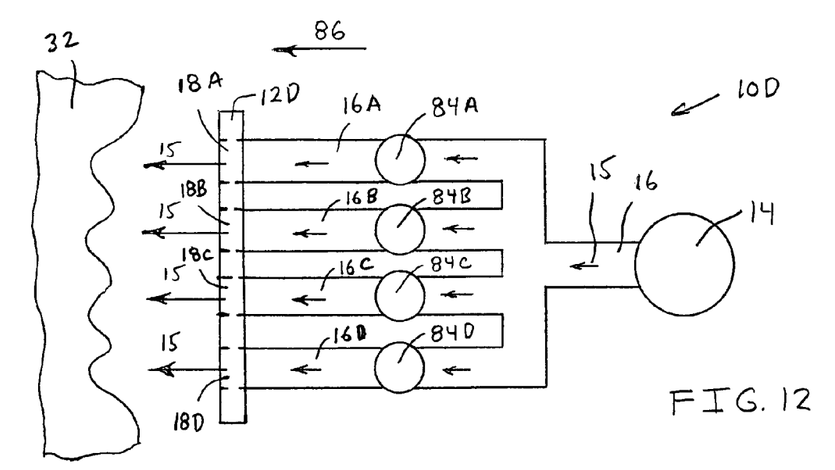
FIG. 12 illustrates a plan view of the fluid shovel apparatus of FIG. 11.

FIG. 12 illustrates a plan view of the fluid shovel apparatus 10D of FIG. 11. The pressure apparatus 14 provides pressurized fluid 15. The conduit system 16 includes conduits 16A, 16B, 16C, and 16D. Conduit 16A connects with the exhaust port 18A. Conduit 16B connects with the exhaust port 18B. Conduit 16C connects with the exhaust port 18D. The pressure apparatus 14 provides pressurized fluid 15 to the conduit system 16. A control valve 84A regulates the amount of pressurized fluid 15 flowing through the conduit 16A and through the fluid exhaust port 18A. A control valve 84B regulates the amount of pressurized fluid 15 flowing through the conduit 16B and through the fluid exhaust port 18B. A control valve 84C regulates the amount of pressurized fluid 15 flowing through the conduit 16C and through the fluid exhaust port 18C. A control valve 84D regulates the amount of pressurized fluid 15 flowing through the conduit 16D and through the fluid exhaust port 18C. The control valves 84A-84D allows the pressurized fluid 15 flow to be balanced between fluid exhaust ports 18A-18D. The fluid shovel apparatus 10D is propelled in a forward direction (directional arrow 86) towards the pile of loose material 32. The pressurized fluid 15 ejects from each fluid exhaust port 18A-18D and pushes in a forward direction (directional arrow 86) against the loose material 32.

Figure 13:
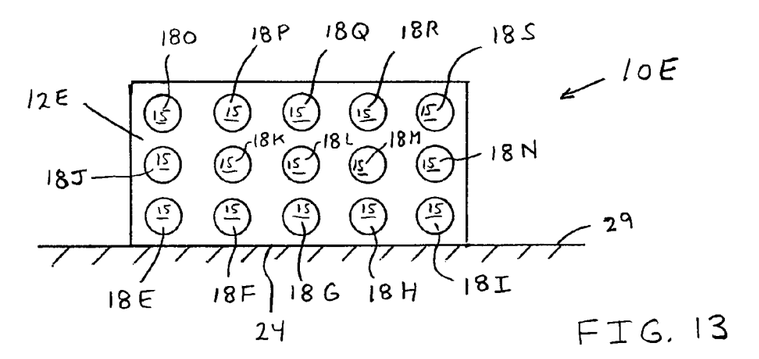
FIG. 13 illustrates a front view of another embodiment of a fluid shovel apparatus in accordance with the present invention, wherein a blade includes a plurality of fluid exhaust ports.

FIG. 13 illustrates a front view of another embodiment of a fluid shovel apparatus 10E in accordance with the present invention. The fluid shovel apparatus 10E includes a blade 12E. The blade 12E includes a plurality of fluid exhaust ports 18E-18S. The pressurized fluid 15 flows out of each fluid exhaust ports 18E-18S in a direction substantially perpendicular to the blade 12E. The bottom face 24 of the blade 12E rests upon the support surface 29. Only exhaust ports 18E-18S are shown in this figure, however any number of exhaust ports may be included in the blade 12E. At least one of the exhaust ports 18E-18S may be located adjacent to the lower surface 24 of the blade 12E.

Figure 14:
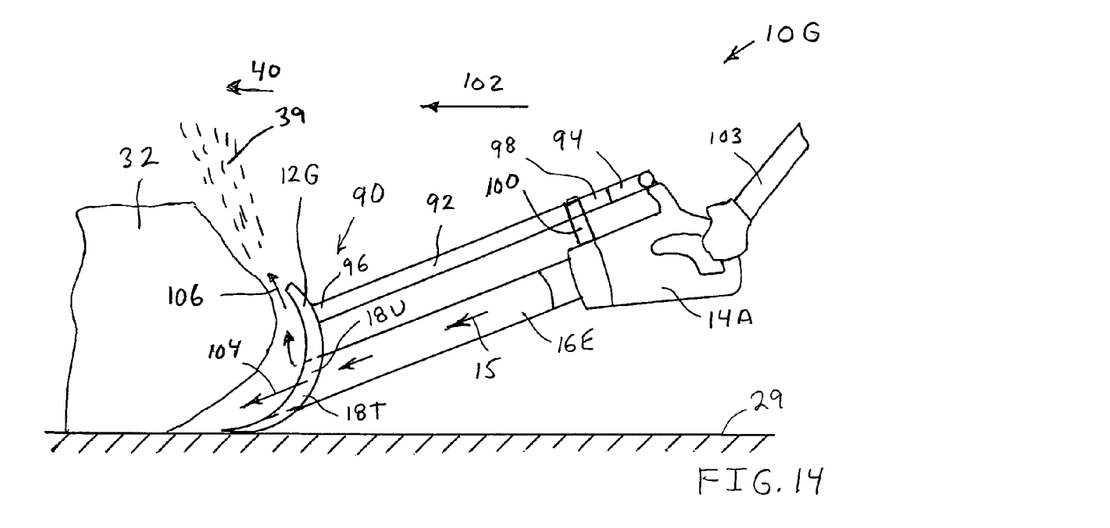
FIG. 14 illustrates a side view of another embodiment of a fluid shovel apparatus in accordance with the present invention, wherein the fluid shovel apparatus includes a shovel apparatus and a portable pressure apparatus.
Figure 15:
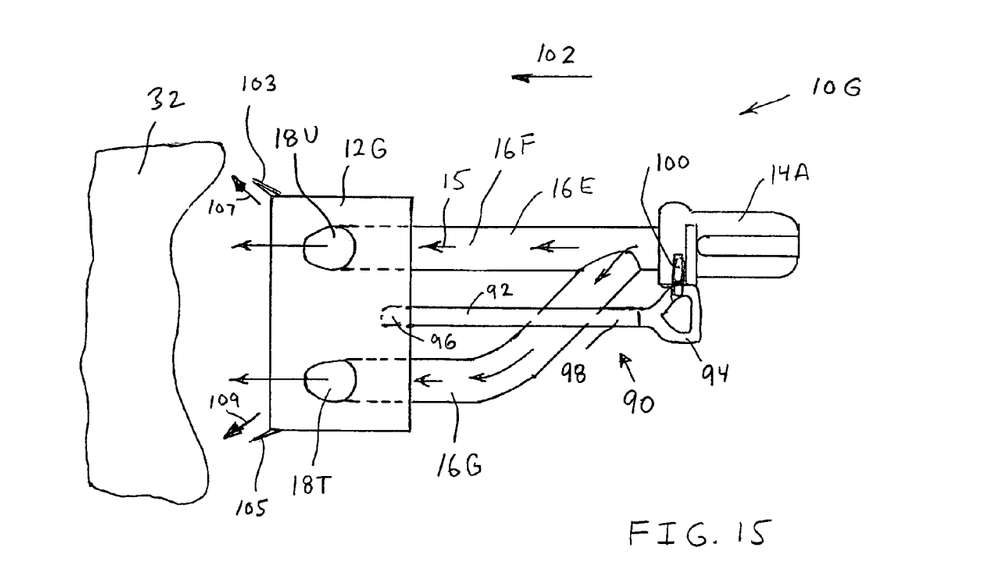
FIG. 15 illustrates a plan view of the fluid shovel apparatus of FIG. 14.

FIGS. 14 and 15 illustrate another embodiment of a fluid shovel apparatus 10G in accordance with the present invention. FIG. 14 illustrates a side view of the fluid shovel apparatus 10G. FIG. 15 illustrates a plan view of the fluid shovel apparatus 10G. The fluid shovel apparatus 10G includes a pressure apparatus 14A, a conduit system 16E, the pressurized fluid 15, a fluid exhaust port 18U, a fluid exhaust port 18T, and a shovel apparatus 90. The shovel apparatus 90 is similar to what is commonly used as a "snow shovel", except for modifications including the fluid exhaust ports 18U and 18T. The shovel apparatus 90 includes a concave curving blade 12G, a shaft 92, and a handle 94. A first end 96 of the shaft 92 is attached to the concave curving blade 12G. A second end 98 of the shaft 92 is attached to the handle 94. The concave curving blade 12G may further include a right forward protruding lip 103 and a left forward protruding lip 105. The right forward protruding lip 103 directs fluid 15 flow in a forward direction (directional arrow 107). The left forward protruding lip 105 directs fluid 15 flow in a forward direction (directional arrow 109). The pressure apparatus 14A may include any suitable pressure source such as a blower, a fan, a portable electric blower, a portable gasoline engine powered blower, or the like. A coupling apparatus 100 attaches the pressure apparatus 14A to the shovel apparatus 90. The pressurized fluid 15 may include any suitable fluid such as air, water, or the like. The pressure apparatus 14A supplies pressurized fluid 15 to the conduit system 16E. The conduit system 16E includes a conduit 16F and a conduit 16G. The conduit 16F is connected to the fluid exhaust port 18U. The conduit 16G is connected to the fluid exhaust port 18T. The fluid exhaust ports 18T and 18U are located within the blade 12G. Pressurized fluid 15 flows through the conduit 16F and through the fluid exhaust port 18U. Pressurized fluid 15 flows through the conduit 16G and through the fluid exhaust port 18T. Pressurized fluid 15 ejects in a forward direction (directional arrow 104) out of the fluid exhaust port 18U towards the pile of loose material 32. Pressurized fluid 15 ejects in a forward direction (directional arrow 104) out of the fluid exhaust port 18T and towards the pile of loose material 32. The fluid shovel apparatus 10G is propelled in the forward direction (directional arrow 102) towards the pile of loose material 32. The fluid shovel apparatus 10G may be propelled by any suitable system such as a person 103, or the like. The pressurized fluid 15 pushes under the loose material 32 in a downward direction (directional arrow 104) as shown in FIG. 14. Additionally, the pressurized fluid 15 flows in an upward flow direction (directional arrow 106) between the loose material 32 and the concave curving blade 12G. This pressurized fluid 15 flowing in the upward flow direction (directional arrow 106) carries loose material 32 upward and forward of the concave curving blade 12G. When the loose material 32 is snow, the pressurized fluid 15 pulverizes the snow into small dry flakes 39 which are lifted in the upward direction (directional arrow 106) and carried away by any blowing wind 40. Additionally, the pressurized fluid 15 removes moisture surrounding the small dry flakes 39. Additionally, the pressurized fluid 15 strikes the support surface 29 and completely cleans and dries the support surface 29. The fluid exhaust ports 18U and 18T may be but are not limited to a size about at least about 4.5 cm in diameter. A common residential leaf blower may provide sufficient fluid 15 flow rate through each fluid exhaust port 18T and 18U. The fluid 15 flow rate through each port 18U and 18T is preferably at least about 4 cubic meters per minute. The fluid 15 flow rate may be adjusted to ensure that the loose material 32 is lifted from the concave curving blade 12G.

Figure 16:
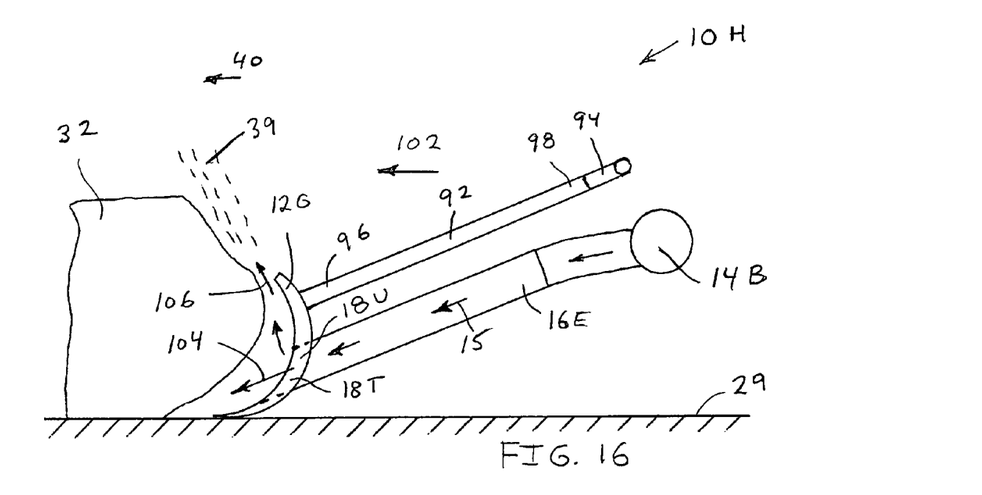
FIG. 16 illustrates a side view of another embodiment of a fluid shovel apparatus in accordance with the present invention, wherein a portable pressure apparatus is remotely located from the fluid shovel apparatus.

FIG. 16 illustrates a side view of another embodiment of a fluid shovel apparatus 10H. This fluid shovel apparatus 10H is similar to the fluid shovel apparatus 10G shown in FIGS. 14 and 15, except that the pressure apparatus 14A is replaced with a remotely located pressure apparatus 14B. The remotely located pressure apparatus 14B may be any suitable pressure source such as a backpack blower, a wheeled blower, or the like. A person may push on the handle 94 in a forward direction (directional arrow 102) to move the concave curving blade 12G towards the loose material 32.

Figure 17:
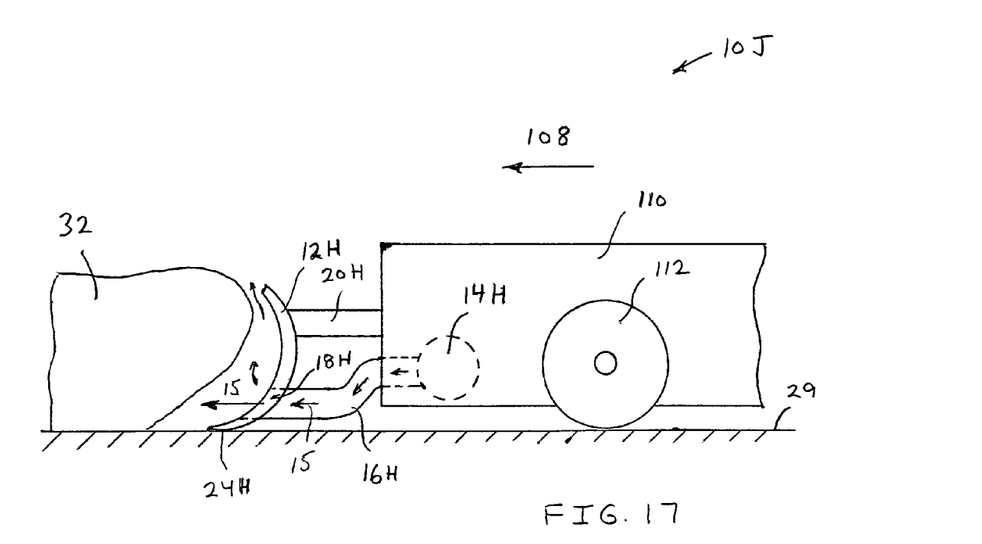
FIG. 17 illustrates a side view of another embodiment of a fluid shovel apparatus in accordance with the present invention, wherein the fluid shovel apparatus is attached to a motorized propulsion vehicle.

FIG. 17 illustrates a side view of another embodiment of a fluid shovel apparatus 10J. The fluid shovel apparatus 10J includes a motorized propulsion vehicle 110, a propulsion member 20H, a blade 12H, a pressure apparatus 14H, a conduit system 16H, the pressurized fluid 15 and at least one fluid exhaust port 18H. The blade 12H includes a lower surface 24H which rests upon the support surface 29. The motorized propulsion vehicle 110 may be any suitable vehicle such as a garden tractor, a truck, an all terrain vehicle, a lawn mower, a car, or the like. The motorized propulsion vehicle 110 may include a plurality of wheels wherein one wheel 112 of the plurality of wheels is shown in FIG. 17. The pressure apparatus 14H provides the pressurized fluid 15. The pressure apparatus 14H is located inside or on the motorized propulsion vehicle 110. The pressure apparatus 14H may be any suitable pressure source such as a pump, a blower, a fan, a compressor, or the like. The pressurized fluid 15 may be any suitable fluid such as, air, nitrogen, water, or the like. The pressurized fluid 15 flows from the pressure apparatus 14H through the conduit system 16 and through the at least one fluid exhaust port 18H. The fluid exhaust port 18H is an opening through the blade 12H. The motorized propulsion vehicle 110 moves the blade 12H in a forward direction (directional arrow 108). The fluid 15 flows through the blade 12H and ejects towards the pile of loose material 32 in the forward direction (directional arrow 108).

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:
1. A fluid shovel apparatus comprising:
a blade including a rear face and a front face;
at least one fluid exhaust port extending through the blade from the rear face of the blade to the front face of the blade;
a pressure apparatus for providing a pressurized fluid;
a conduit system comprising at least one separate conduit for each fluid exhaust port wherein each separate conduit is protruding from the rear face of the blade and wherein the conduit system transports the pressurized fluid from the pressure apparatus to each fluid exhaust port wherein the pressurized fluid is ejected through each fluid exhaust port extending through the blade from the rear face of the blade to the front face of the blade and angled such that at least a portion of the pressurized fluid is propelled in a forward direction away from the front face of the blade and in a downward direction toward and away from a lower surface of the blade to directly impinge upon a pile of loose material; and
a propulsion member attached to the blade for pushing the blade in the forward direction towards the pile of loose material.

2. The fluid shovel apparatus of claim 1, wherein the pressurized fluid is air.

3. The fluid shovel apparatus of claim 1, wherein the conduit system further includes a flow control valve for each fluid exhaust port for adjusting the amount of pressurized fluid flowing through each fluid exhaust port.

4. The fluid shovel apparatus of claim 1, wherein at least one fluid exhaust port is adjacent to the lower surface of the blade and wherein the lower surface of the blade rests upon a support surface.

5. The fluid shovel apparatus of claim 1, wherein the propulsion member is configured to allow a person to push in the forward direction towards loose material.

6. The fluid shovel apparatus of claim 1, wherein the at least one fluid exhaust port is circular in cross section.

7. The fluid shovel apparatus of claim 1, wherein the blade is a flat surface.

8. The fluid shovel apparatus of claim 1, wherein the blade is a concave curving surface.

9. The fluid shovel apparatus of claim 1, wherein the blade includes a flat portion, a top upward protruding portion, and a bottom protruding portion.

10. The fluid shovel apparatus of claim 1, wherein the blade is configured of a thin concavely shaped material to be used as a snow shovel.

11. The fluid shovel apparatus of claim 10, wherein the blade further includes a right forward protruding lip and a left forward protruding lip.

12. The fluid shovel apparatus of claim 1, wherein the pressure apparatus is a portable electric blower.

13. The fluid shovel apparatus of claim 1, wherein the pressure apparatus is a portable gasoline engine powered blower.

14. The fluid shovel apparatus of claim 1, wherein a motorized propulsion vehicle is attached to the propulsion member and wherein the motorized propulsion vehicle is selected from the group consisting of a garden tractor, a truck, an all terrain vehicle, a lawn mower and a car.

15. A method for pushing and lifting loose material, comprising the steps of:
    providing a blade with at least one fluid exhaust port extending through the blade from a rear face of the blade to a front face of the blade;
    providing a conduit system comprising at least one separate conduit for each fluid exhaust port wherein each separate conduit is protruding from the rear face of the blade;
    providing a pressurized fluid transported through the conduit system and ejecting through each fluid exhaust port extending through the blade from the rear face of the blade to the front face of the blade and angled such that at least a portion of the pressurized fluid is propelled in a forward direction away from the front face of the blade and in a downward direction toward and away from a lower surface of the blade to directly impinge upon a pile of loose material; and
    pushing the blade towards the pile of loose material.

16. The method of claim 15, further comprising the steps of:
    pushing the blade at the pile of loose material while maintaining a yaw angle relative to the blade and a curb.

17. The method of claim 15, further comprising the steps of:
    pushing the blade at the pile of loose material while maintaining a pitch angle relative to the blade and a support surface.

18. The method of claim 15, wherein a portable blower provides the pressurized fluid.

19. The method of claim 15, wherein a person pushes the blade towards the pile of loose material.

20. The method of claim 15, wherein a motorized propulsion vehicle is attached to the blade and pushes the blade towards the pile of loose material and wherein the motorized propulsion vehicle is selected from the group consisting of a garden tractor, a truck, an all terrain vehicle, a lawn mower and a car.

21. The fluid shovel apparatus of claim 1, wherein at least one wheel assembly is attached to the blade for displacing the blade across a support surface.

22. The fluid shovel apparatus of claim 21, wherein each wheel assembly includes at least one wheel.

23. The fluid shovel apparatus of claim 1, wherein the conduit system further includes at least one straight conduit connecting the pressure apparatus with at least one fluid exhaust port.

24. The method of claim 15, further comprising the step of providing at least one wheel assembly attached to the blade for displacing the blade across a support surface.

25. The fluid shovel apparatus of claim 1, wherein the pressurized fluid ejecting from each fluid exhaust port is at least 4 cubic meters per minute.

26. The method of claim 15, further comprising the step of: wherein the pressurized fluid ejecting through each fluid exhaust port is at least 4 cubic meters per minute.

27. The fluid shovel apparatus of claim 1, wherein each fluid exhaust port is at least 4.5 cm in diameter.

28. The method claim 15, further comprising the step of: wherein each fluid exhaust port is at least 4.5 cm in diameter.

* * * * *

UNITED STATES PATENT AND TRADEMARK OFFICE
CERTIFICATE OF CORRECTION

PATENT NO. : 7,716,857 B2 Page 1 of 1
APPLICATION NO. : 11/786233
DATED : May 18, 2010
INVENTOR(S) : Nagamatsu et al.

It is certified that error appears in the above-identified patent and that said Letters Patent is hereby corrected as shown below:

Column 5

Line 14, delete "assembly 62B" and Insert -- assembly 60B --
Line 14, delete "bracket 62B" and Insert -- bracket 64B --

Column 6

Line 24, delete "18D" and Insert -- 18C --
Line 35, delete "18C" and Insert -- 18D --

Signed and Sealed this

Twenty-seventh Day of July, 2010

David J. Kappos
*Director of the United States Patent and Trademark Office*